(12) United States Patent
Sunay et al.

(10) Patent No.: US 10,327,152 B2
(45) Date of Patent: Jun. 18, 2019

(54) METHOD AND APPARATUS FOR VIRTUALIZING UNLICENSED SPECTRUM

(71) Applicant: NETSIA, INC., Sunnyvale, CA (US)

(72) Inventors: Mehmet Oguz Sunay, San Francisco, CA (US); Ulas Can Kozat, Mountain View, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/258,692

(22) Filed: Sep. 7, 2016

(65) Prior Publication Data

US 2018/0049109 A1     Feb. 15, 2018

Related U.S. Application Data

(60) Provisional application No. 62/215,131, filed on Sep. 7, 2015.

(51) Int. Cl.
| | | |
|---|---|---|
| *H04W 16/14* | (2009.01) | |
| *H04W 16/16* | (2009.01) | |
| *H04W 16/18* | (2009.01) | |
| *H04W 24/02* | (2009.01) | |
| *H04W 24/08* | (2009.01) | |
| *H04W 28/02* | (2009.01) | |

(Continued)

(52) U.S. Cl.
CPC ........... *H04W 16/18* (2013.01); *H04W 16/14* (2013.01); *H04W 16/16* (2013.01); *H04W 24/02* (2013.01); *H04W 24/08* (2013.01); *H04W 28/0268* (2013.01); *H04W 88/08* (2013.01); *H04W 88/12* (2013.01); *H04W 88/18* (2013.01); *H04W 92/12* (2013.01)

(58) Field of Classification Search
CPC ... H04W 16/02–16/225; H04W 24/02; H04W 24/08; H04W 28/0268; H04W 28/06–28/26; H04W 48/06; H04W 48/16; H04W 48/18; H04W 72/044–72/0446; H04W 72/06–72/10; H04W 72/085; H04W 72/1226–72/1257; H04W 80/08–80/12; H04W 88/08–88/18; H04W 92/12
See application file for complete search history.

(56) References Cited

U.S. PATENT DOCUMENTS

| | | |
|---|---|---|
| 8,874,124 B2 | 10/2014 | Clegg |
| 9,031,017 B2 | 5/2015 | Ratasuk et al. |

(Continued)

FOREIGN PATENT DOCUMENTS

| | | |
|---|---|---|
| WO | 2015009433 | 1/2015 |

*Primary Examiner* — Timothy J Weidner
(74) *Attorney, Agent, or Firm* — IP Authority, LLC; Ramraj Soundararajan (57) ABSTRACT

A system and method implemented at a base station: assesses, for each channel in an unlicensed frequency spectrum for use by the base station, a list of quality of service (QoS) class indicator (QCI) values, receives a packet flow having an associated packet flow QCI value, identifies at least one channel in the unlicensed frequency spectrum having the associated packet flow QCI value in its list of QCI values, and allows the packet flow in the unlicensed frequency spectrum on the at least one channel identified, where the packet flow is allowed in the unlicensed frequency spectrum for any of the following: for the uplink, for the downlink, or for both uplink and downlink.

8 Claims, 8 Drawing Sheets

(51) Int. Cl.
*H04W 88/08* (2009.01)
*H04W 88/12* (2009.01)
*H04W 88/18* (2009.01)
*H04W 92/12* (2009.01)

(56) References Cited

U.S. PATENT DOCUMENTS

| | | | |
|---|---|---|---|
| 2009/0219912 A1* | 9/2009 | Wengerter | H04W 72/1226 370/345 |
| 2012/0218890 A1* | 8/2012 | Gerkis | H04W 72/1236 370/230 |
| 2014/0369201 A1* | 12/2014 | Gupta | H04W 48/06 370/235 |
| 2015/0063098 A1 | 3/2015 | Yavuz et al. | |
| 2015/0065152 A1 | 3/2015 | Sadek | |
| 2015/0126207 A1 | 5/2015 | Li et al. | |
| 2016/0021596 A1* | 1/2016 | Hui | H04W 40/04 370/329 |

* cited by examiner

METHOD AND APPARATUS FOR VIRTUALIZING UNLICENSED SPECTRUM

RELATED APPLICATIONS

This application claims benefit of U.S. provisional application Ser. No. 62/215,131 filed on Sep. 7, 2015.

BACKGROUND OF THE INVENTION

Field of Invention

The present application relates to the use of unlicensed spectrum by cellular communication systems, and more specifically, method and apparatus for programmatically virtualizing the unlicensed spectrum so that in a given location within the cellular system, it is utilized only for certain types of flows.

Discussion of Related Art

This invention is concerned with the specification of a method and apparatus for the effective use of the unlicensed spectrum by cellular systems that also have access to licensed spectrum for their operations. The invention programmatically virtualizes the unlicensed spectrum so that in different locations within the cellular network, it is dynamically allocated for different types of packet flows.

A number of related prior art exists. The patent application US 2015/0126207 A1 considers LTE access points (APs) utilizing the unlicensed spectrum by providing measurements to an LTE base station, which in return reallocates the channels in the unlicensed spectrum to individual LTE APs. The disclosure specifies priorities of each frequency band at each LTE AP location based on the level of interference or traffic activity happening in each frequency band.

The patent specification U.S. Pat. No. 9,031,017 B2 considers an LTE base station to transmit for a time period over an unlicensed band after detecting the medium is clear. As part of using the unlicensed spectrum, power control is also carried out to limit the range of interference.

The patent application US 2015/0063098 A1 discloses methods for switching small cells using unlicensed spectrum to low utilization modes to limit the usage of unlicensed spectrum both in time and frequency when the load of small cells drops below a preset threshold.

The patent application WO 2015/009433 A1 specifies a reservation method over the unlicensed spectrum where a base station, after performing a clear channel assessment, broadcasts a first signal during the first time period to announce downlink transmissions to a particular UE over a second time period.

The patent specification U.S. Pat. No. 8,874,124 B2 specifies a dual-band base station that uses one radio access technology in the licensed band (e.g., LTE) and replaces the physical layer communication of the said radio access technology with another physical layer technology to be used over the unlicensed band (e.g., WiFi). The base station in either case is seen as a regular base station to the core network, while from UE perspective it can be seen as a base station or a hot spot access point. UE and the base station compare the conditions (e.g., load, bandwidth, interference, etc.) between the licensed and unlicensed band, initiate a signaling to switch between the two bands.

The patent application US 2015/0065152 A1 specifies an opportunistic carrier aggregation framework using both licensed and unlicensed bands. One or more metrics are used to switch on/off one or more bands from the unlicensed spectrum. The metrics can be cell loading, traffic type, QoS indication, number of users in the unlicensed band, available backhaul bandwidth, and interference from access points. The bands in the unlicensed bands are divided into preferred and non-preferred sets with more bias associated with the bands in the preferred set to be selected for communication.

Embodiments of the present invention are an improvement over prior art systems and methods.

SUMMARY OF THE INVENTION

In one embodiment, the present invention provides a method implemented at a base station comprising: (a) assessing quality of a plurality of channels in an unlicensed frequency spectrum for use by the base station; (b) receiving a packet flow having an associated quality of service (QoS) class; (c) identifying, based on the quality assessed in (a), at least one channel within the plurality of channels in the unlicensed frequency spectrum supporting the associated QoS class in (b); and (d) allowing the packet flow in the unlicensed frequency spectrum on the at least one channel identified in (c) supporting the associated QoS class, wherein the packet flow is allowed in the unlicensed frequency spectrum for any of the following: for the uplink, for the downlink, or for both uplink and downlink.

In another embodiment, the present invention provides a method implemented at a base station comprising: (a) assessing, for each channel in a plurality of channels in an unlicensed frequency spectrum for use by the base station, a list of quality of service (QoS) class indicator (QCI) values; (b) receiving a packet flow having an associated packet flow QCI value; (c) identifying at least one channel within the plurality of channels in the unlicensed frequency spectrum having the associated packet flow QCI value in its list of QCI values; and (d) allowing the packet flow in the unlicensed frequency spectrum on the at least one channel identified in (c) having the associated packet flow QCI value in its list of QCI values, wherein the packet flow is allowed in the unlicensed frequency spectrum for any of the following: for the uplink, for the downlink, or for both uplink and downlink.

In another embodiment, the present invention provides a system comprised of a plurality of programmable base stations that can use the unlicensed frequency spectrum, and a plurality of user equipment, the system comprising: (a) a modeler subsystem: (i) monitoring unlicensed frequency spectrum and collecting measurements in real-time from the plurality of programmable base stations and user equipment, (ii) building a model for each channel of the unlicensed frequency spectrum and for each base station location and mapping channel and location information into a quality of service class indicator (QCI) based on such measurements; (b) a viewer subsystem comprising a database storing channels, locations, and their corresponding QCI; (c) a spectrum controller subsystem dynamically mapping each packet flow to one of more matching channels in the unlicensed frequency spectrum matching the packet flow's QCI; and (d) either a local controller at a same location with each programmable base station or a remote controller, wherein either the local controller or the remote controller is in communications with the spectrum controller subsystem, or the spectrum controller subsystem is integrated into the local or remote controller, the local or remote controller programming the programmable base stations with the mapping of each flow into a channel in the unlicensed frequency spectrum.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 shows collocated WiFi hotspots.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The disclosed invention provides a method and apparatus for utilizing unlicensed radio spectrum by a cellular mobile network operator (MNO) while other wireless technologies such as WiFi and/or other MNOs co-exist in the same unlicensed spectrum. The MNO operates its own radio access technology such as LTE, LTE-A, or any other existing or upcoming air interface standard over its own licensed spectrum as well as the unlicensed spectrum through (i) carrier aggregation methods that enable a base station to schedule wireless transmissions over multiple frequency bands in the wireless spectrum, (ii) hotspot base stations that only serve over the unlicensed spectrum as an alternate radio access technology to WiFi, (iii) or both. In contrast to licensed spectrum, the MNO has no access privileges or exclusive usage rights over the unlicensed spectrum. When other operators, entities, or individual users are present, depending on their usage characteristics, the unlicensed spectrum potentially provides an unreliable medium to serve mobile subscribers paying for a reliable broadband wireless access. To adequately serve flows requiring different quality-of-service or quality-of-experience levels, it is critical for an MNO to (i) assess the location-specific quality of each of the channels in the unlicensed spectrum, for example, at each antenna site with sufficiently frequent updates, and (ii) decide which quality of service (QoS) classes may be acceptably serviced over which unlicensed band channels.

The method of invention consists of three main stages:
1. Monitoring the plurality of the unlicensed spectrum channels for any activity by different wireless systems using the same channels;
2. Determining, for each geography in the network and each available channel of the unlicensed band for that geography, a list of QoS classes, often described by a set of QoS Class Indicator (QCI) values, that can be adequately served;
3. Dynamically and programmatically furnishing each base station with the said list of unlicensed spectrum channels for that location.

Then, the base station serves a flow on a given channel in the unlicensed spectrum, only if the QCI value of the said flow is included in the QCI set of that channel. The location specific QCI list of each channel is dynamically updated for each base station when the monitoring results require such an update. Base stations that use the unlicensed spectrum perform admission control and scheduling decisions based on the overall available bandwidth for each QoS class including the unlicensed spectrum.

The method and apparatus disclosed by this invention utilizes the unlicensed spectrum to its full extent by matching a packet flow's QoS requirements to the supportable QoS over the unlicensed spectrum.

Figure 1:
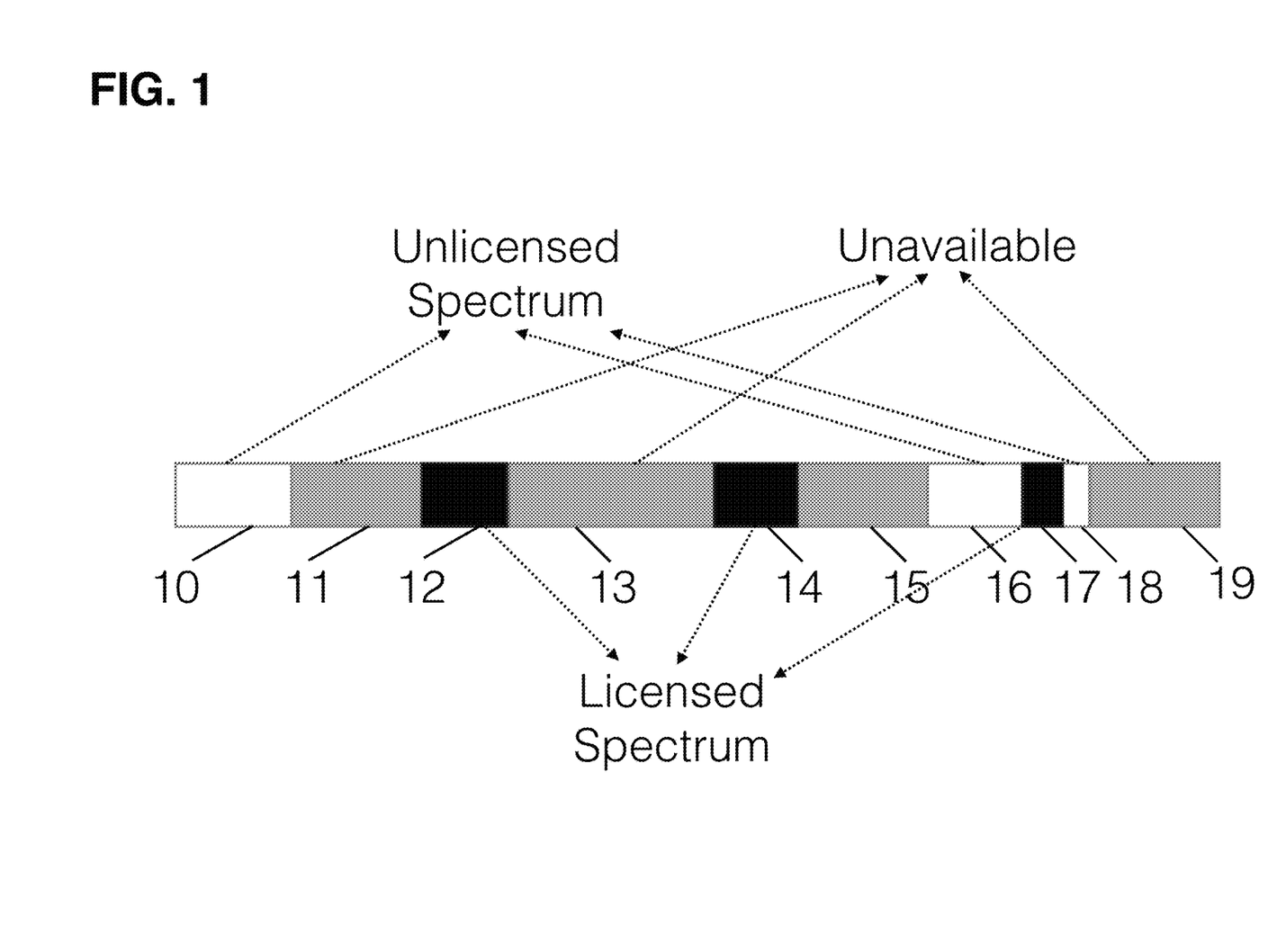
FIG. 1 shows how the continuum of radio spectrum is partitioned into licensed, unlicensed and unavailable portions.

In a typical embodiment, a network operator deploys its radio access technology over both its own licensed radio spectrum that this operator has exclusive usage rights and the unlicensed radio spectrum that is open to everyone's use within the limitations that the regulatory bodies enforce in each geographical location. The spectrum bands that are reserved for (i) specific services as described by the regulatory bodies, (ii) future use, or (iii) leasing to other operators are all referred to as unavailable spectrum. In FIG. 1, these three kinds of spectrum bands are depicted for illustration purposes only. In this example, bands (10), (16), (18) constitute the unlicensed spectrum; (11), (13), (15), (19) constitute the unavailable spectrum; and (12), (14), (17) constitute the spectrum licensed to the operator. Meaning, the operator may utilize (12), (14), and (17) while can also optionally utilize (10), (16), and (18).

Figure 2:
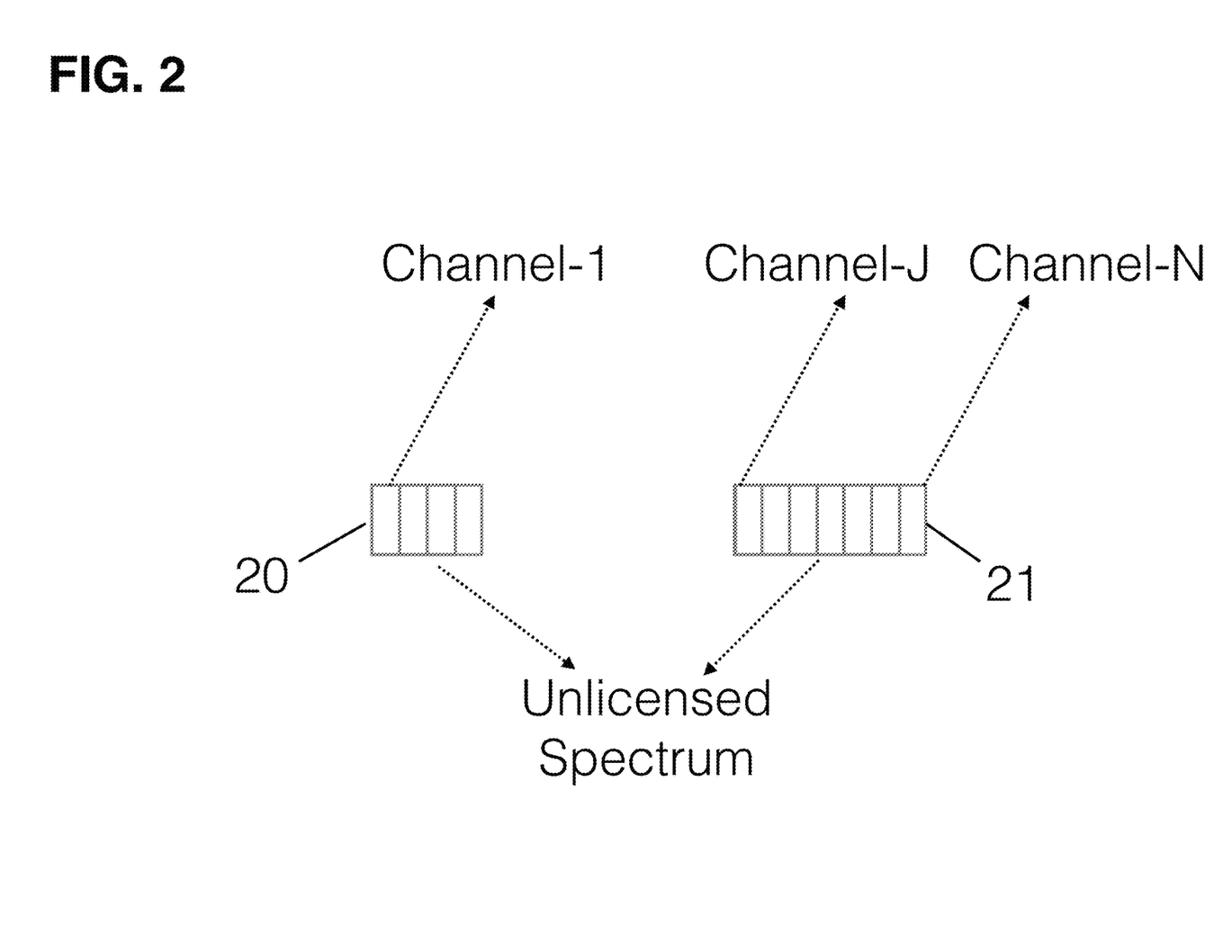
FIG. 2 shows how the unlicensed spectrum is further divided into disjoint sub-bands forming individual wireless channels of the unlicensed spectrum. Each channel is potentially used between WiFi AP and its users.

In a typical embodiment, each unlicensed frequency band is further divided into channels. FIG. 2 shows the case where there are two disjoint unlicensed frequency bands wherein the first band (20) has four channels and second band (21) has seven channels. Although the invention does not limit itself on the number of channels, in a typical embodiment, each channel usually has one to one correspondence with the channel definitions of IEEE 802.11 or WiFi standards as unlicensed spectrum and mainly used in WiFi networks.

Figure 3:
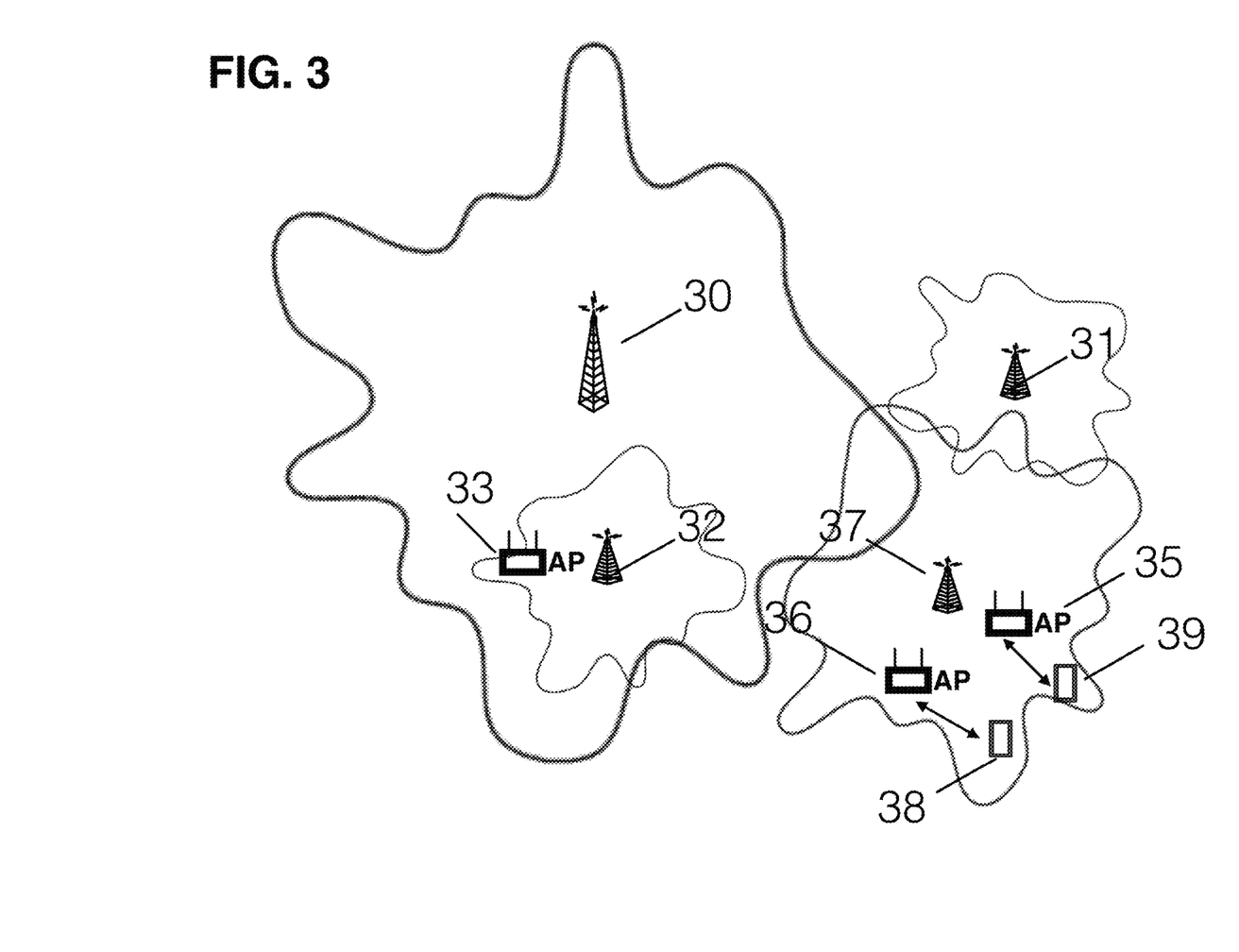
FIG. 3 depicts different types of base stations that can use licensed and/or unlicensed spectrum.

The mobile network can utilize the unlicensed spectrum in several different configurations. In one configuration, the unlicensed spectrum is accessed only for the downlink (i.e., from base station to user equipment) or only for the uplink (i.e., from user equipment to base station) transmissions. In another common embodiment, it is used for both downlink and uplink transmissions. In one configuration, a base station uses both the licensed and unlicensed spectrum. In another configuration, a base station either uses the licensed spectrum or the unlicensed spectrum. FIG. 3 illustrates an example network that utilizes the method of the invention. In the exemplary illustration, the macro cell base station (30) with large coverage area uses only the licensed spectrum to be able to transmit at a higher power. In the same figure, the small cell (37) utilizes only the unlicensed spectrum, while small cells (31) and (32) utilize both the licensed and unlicensed spectrum. Due to potential co-existence of other wireless networks using the same unlicensed spectrum, base stations might not always use the unlicensed spectrum for some or any of its traffic flows. For instance, in FIG. 3, small cell base station (37) shares the unlicensed spectrum with WiFi access points (APs) (35) and (36) and their associated users (38) and (39), and therefore its use of the unlicensed spectrum channels will be dictated by the traffic of these four devices. Base station (32) shares the unlicensed spectrum with AP (33). Since there are no current active WiFi users associated with (33), base station (32) has almost full access to the wireless channels in the unlicensed frequency band except for the control signals broadcasted by AP (33). In contrast, base station (37) receives contention from four devices to access and control the medium. Thus, (37) cannot use all the channels in the unlicensed spectrum for all its flows. The channels that receive contention can be accessed less frequently and less reliably, thus only flows that can accommodate relatively long and varying access delays can be scheduled on such channels. The channels that are not occupied by the co-existing WiFi devices on the other hand can provide a reliable channel even for conversational voice traffic that requires delay guarantees.

Figure 4:
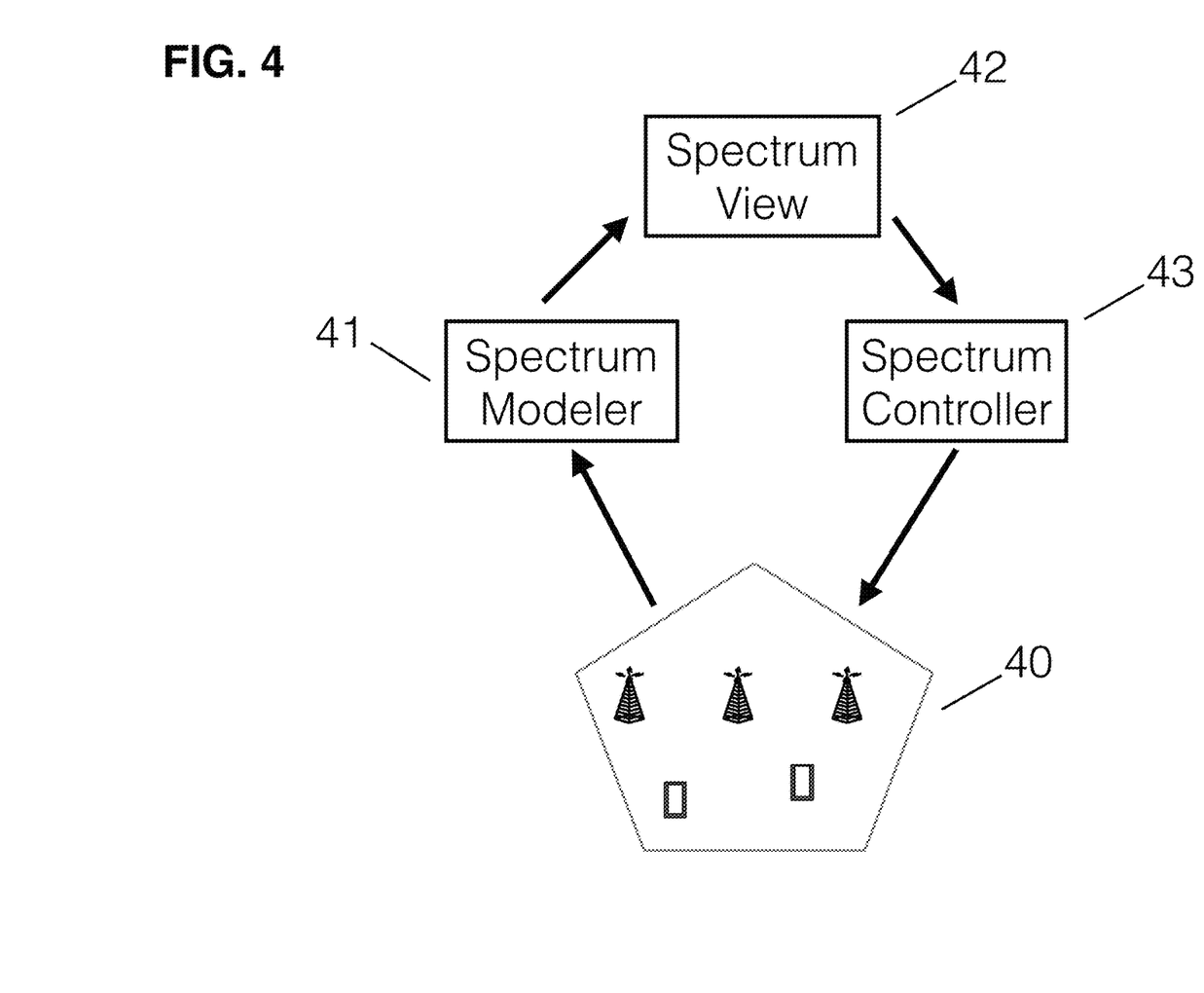
FIG. 4 shows the main components of the invention.

A schematic illustration of the physical and/or logical components of the system involved in operating according to the method of the invention is given in FIG. 4. The invention is comprised of programmable forwarding elements (40), Spectrum Modeler (41), Spectrum View (42), and Spectrum Controller (43). The Spectrum Modeler 41 gathers channel measurements on unlicensed spectrum directly from the base stations in cloud 40 and indirectly from the user equipment. The Spectrum Modeler is responsible for modeling the access pattern in the unlicensed spectrum at each location (which can be identified simply with the cell ID, sector ID, or at finer granularity with the estimated geographical coordinates using GPS, cellular, or other localization/positioning technologies). It incorporates new data whenever they are available and builds an updated model based on the most recent medium access history. The model is built for each channel separately. Thus, if there are N locations and M channels, Spectrum Modeler builds N×M models.

Figure 5:
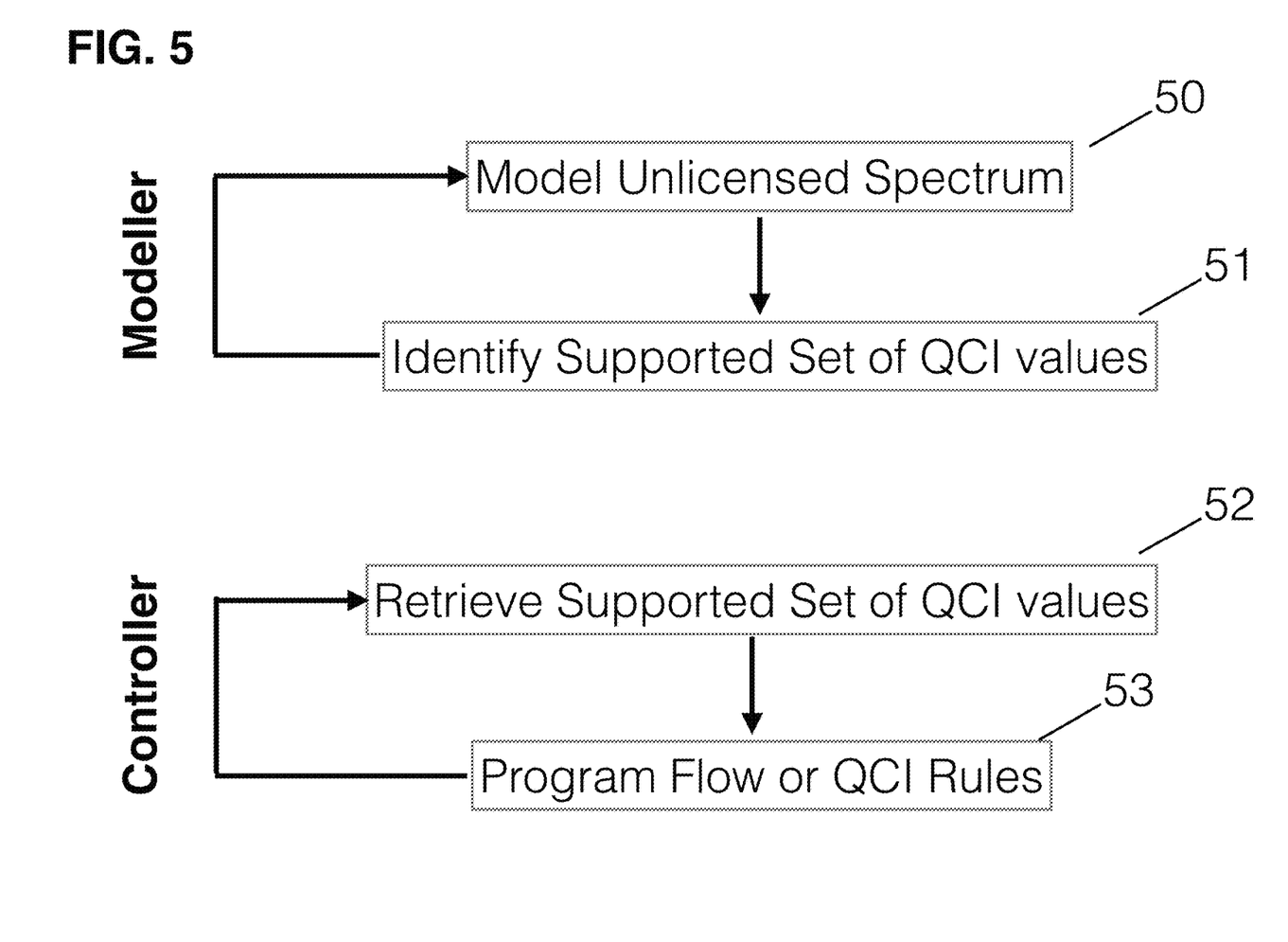
FIG. 5 presents the steps performed by two major components of the invention.

As shown in FIG. 5, after building the per-channel per-location unlicensed spectrum model (50), the Spectrum Modeler identifies the set of QoS Class Indicator (QCI) values that are supportable at each location and at each channel (51). The QCI values are non-negative integers and some of these values are explicitly defined by 3GPP. Distinct QCI values correspond to distinct requirements in one or more of the performance parameters covering at least delay and error targets. They also indicate guaranteed and non-guaranteed data rates. Although standardization bodies such as 3GPP define some of these QCI values, the network operator can also give a propriety definition for each QCI value for its internal network operations overloading the meaning of these values in general as well as in the context of this invention. Each QCI value can also have a meta-data attached to it to specify bandwidth guarantees that can be provided for a given channel in the unlicensed spectrum.

Figure 6:
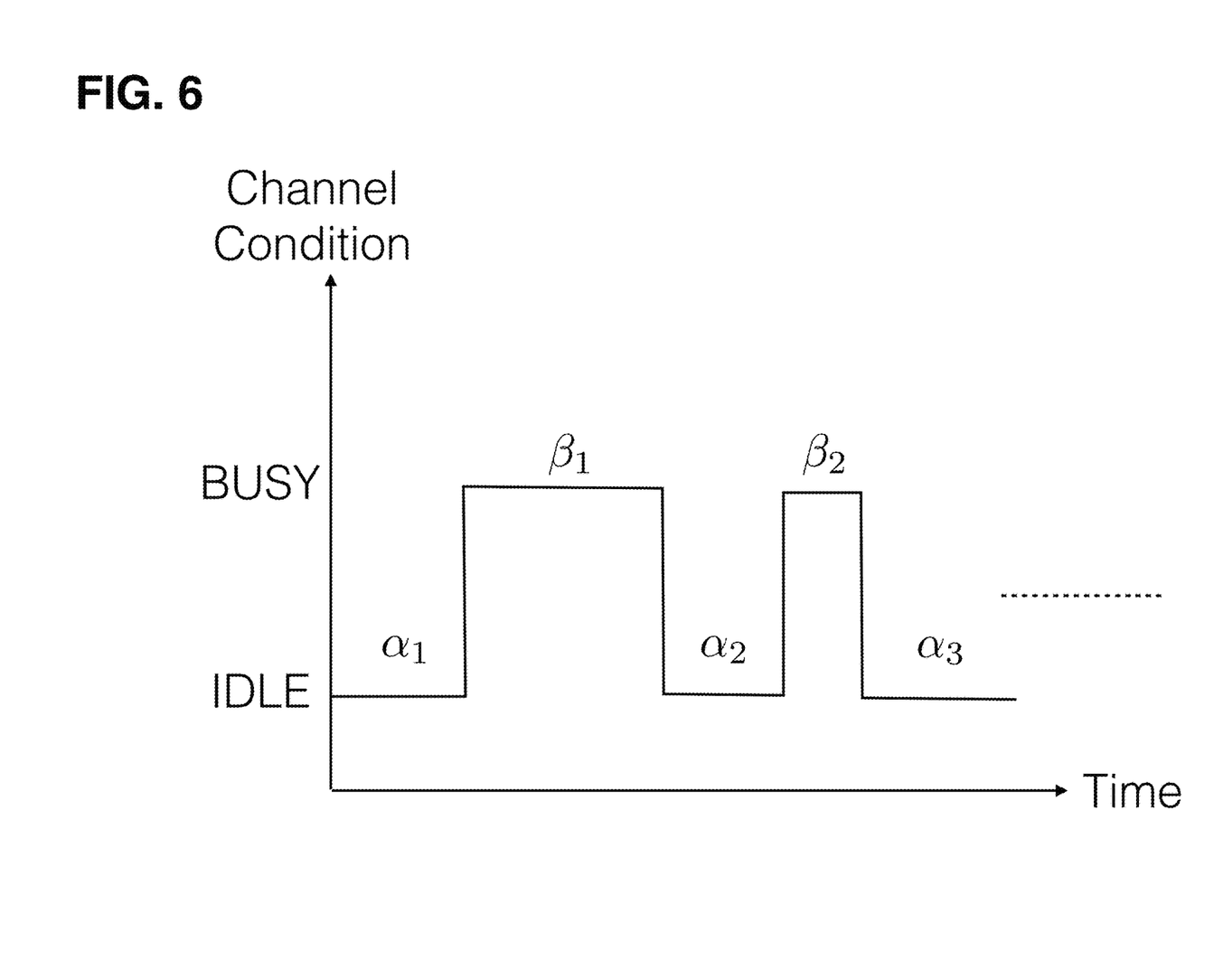
FIG. 6 illustrates how the channel conditions of a radio channel in unlicensed spectrum can be time varying in a non-deterministic manner.

Modeling the channel access can be done in various means. In one embodiment, the Spectrum Modeler builds a model of idle and busy periods of each channel at each location. In FIG. 6, time sequences of idle and busy periods are defined by the duration of each idle and busy period. For instance, in FIG. 6, $\{\alpha 1, \alpha 2, \alpha 3, \ldots\}$ is the sequence of idle periods and $\{\beta 1, \beta 2, \beta 3, \ldots\}$ is the sequence of busy periods. The idle period is defined with respect to the busy period (i.e., if channel is non-busy, it is idle). The busy period is defined with respect to the transmissions over the channel by wireless devices that are not part of the radio access network to which the Spectrum Modeler belongs. Thus, if a base station that belongs to the same MNO as the Spectrum Modeler is transmitting over the unlicensed channel, it is not counted as a busy period from the perspective of Spectrum Modeler. In one embodiment, Spectrum Modeler defines non-overlapping time windows and finds the ratio of idle time in each time window, which is referred to as bandwidth availability. Each time window is typically in the order of 10s of milliseconds representative of the packet generation period from voice codecs. Over a sample of last M time windows (e.g., M=1000), the Spectrum Controller computes the mean, minimum, maximum, median, 90-th, 99-th percentiles of bandwidth availability. Based on these statistics, the Spectrum Controller validates whether QoS targets of each QCI value can be delivered on per channel as well as per location basis.

The Spectrum View unit, (42) in FIG. 4, simply records the supported QCI values and any metadata for each location and channel. In one embodiment, the Spectrum View unit is implemented as a key-value based database; where the key to access data can be location ID, channel ID, or combination of both, whereas the value is the set of supportable QCI values and metadata. In the method of the invention, the Spectrum Modeler writes to the database using unique keys every time the set of supported QCI values or metadata deviates from the last set and metadata committed to the database.

The Spectrum Controller unit, (43) in FIG. 4, accesses the supported QCI values for each channel and location using the Spectrum View. In one embodiment, the Spectrum Controller periodically polls the Spectrum View for each channel and location. In another embodiment, the Spectrum Controller subscribes to event notifications so that whenever the value (i.e., the set of supportable QCI values) of any location and channel is modified, it receives notification from the Spectrum View, upon which Spectrum Controller retrieves the new set of supportable QCI values. Regardless of polling based or event-notification based retrieval, this process repeatedly occurs as illustrated in block (52) in FIG. 5. The Spectrum Controller programs each base station and/or UE by setting new flow or QCI rules (53).

In one embodiment, a local controller is collocated with a base station that performs the wireless transmission. The said local controller makes local admission control and scheduling decisions based on the locally available states such as QoS classes of traffic flows, wireless channel conditions, and/or queue states. In this particular case, the local controller maintains a special table for the unlicensed spectrum, where each row of the said table corresponds to a specific channel of the unlicensed spectrum. The Spectrum Controller programs said channel table into the local controller by adding new entries or modifying the existing ones.

Figure 7:
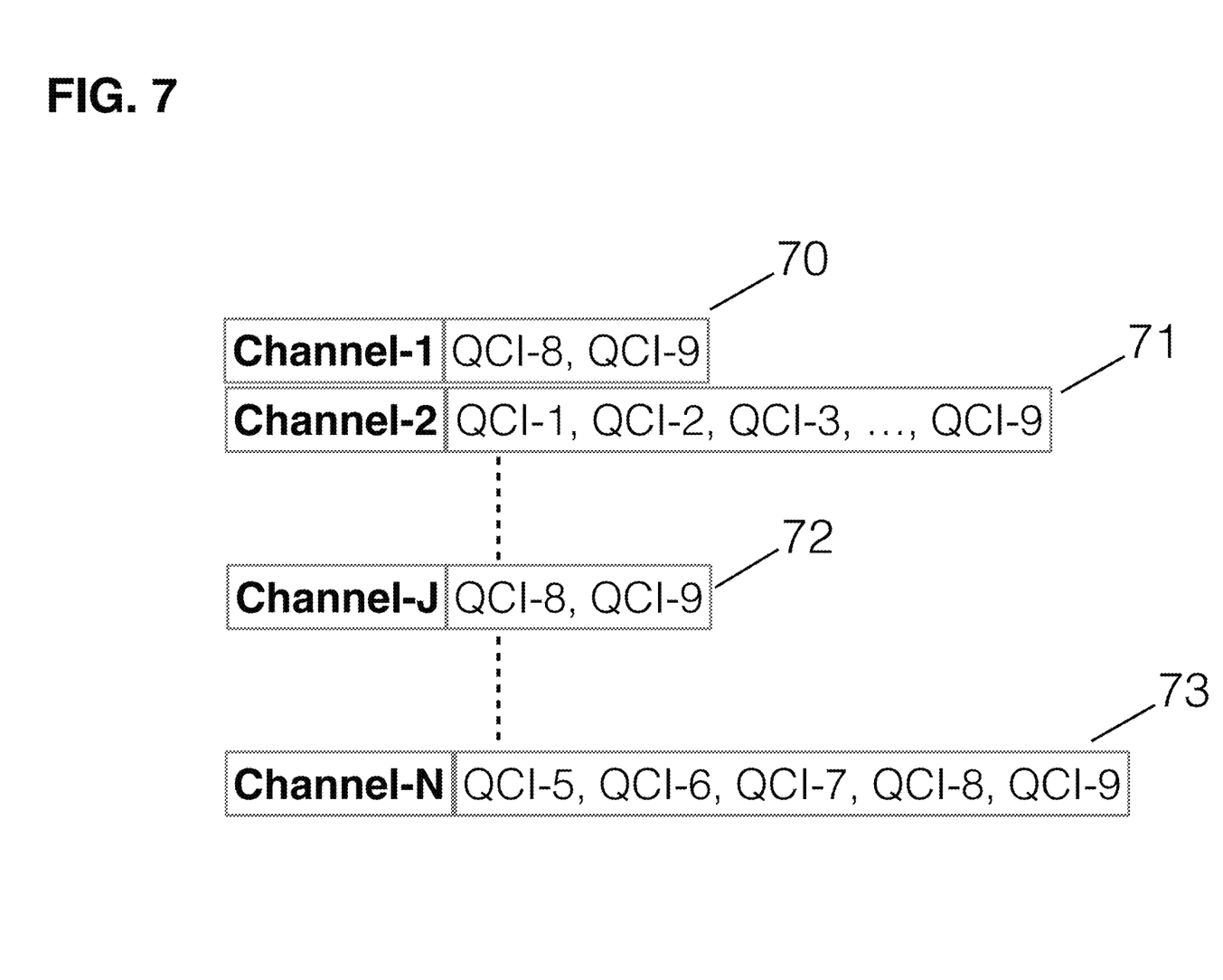
FIG. 7 shows the table generated as a result of radio channel monitoring.

An example of such a channel table is depicted in FIG. 7. In the table, each row corresponds to a specific channel and a variable size list of QCI values are listed as the supported set of QCI values. The local controller determines the total spectrum available for a given QCI value from this table, and adds or modifies metadata for each QCI value listed in a row. In one embodiment, the metadata can be shared across the same QCI values in different rows (e.g., QCI-8 in 70, 72, 73 in FIG. 7). In another embodiment, each QCI value at each row has its own programmable metadata that specifies minimum and maximum supported rate as well as other statistics such as mean, median, 90th percentile, 99th percentile, etc. If the local controller conducts a channel assignment from the unlicensed spectrum, it keeps track of flows scheduled over each channel and available bandwidth to be used for admission control.

In another embodiment, a remote controller potentially collocated with the Spectrum Controller conduct channel assignment decisions for each flow and thus directly programs the flow tables at wireless devices. Yet in another embodiment, without needing a local or remote controller, the Spectrum Controller programs the base stations.

Figure 8:
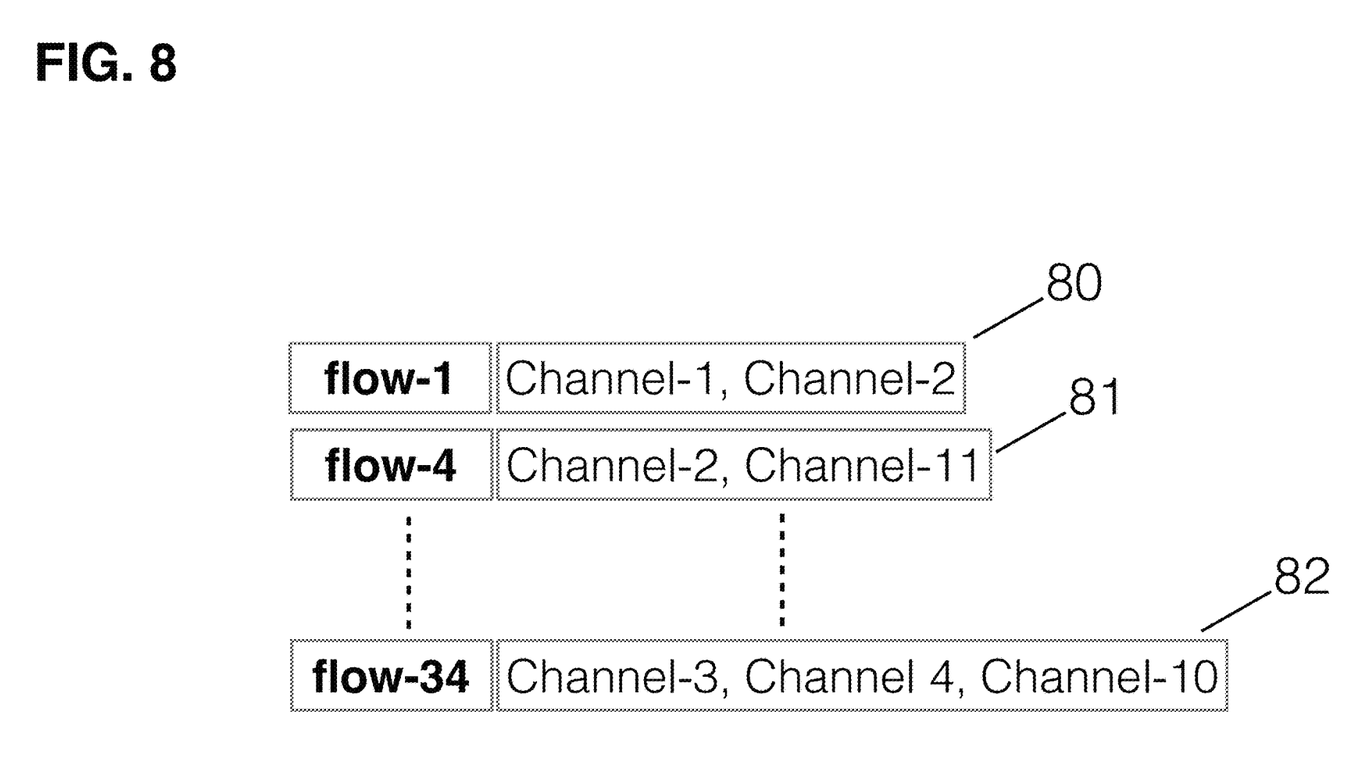
FIG. 8 shows a flow table example, where individual flows with a matching entry in the flow table can be served in one or more of the wireless channels specified in the flow table.

FIG. 8 depicts a flow table that assigns each flow one or more channels from the unlicensed spectrum. The Remote Controller can support a QCI table that is populated by the Spectrum Controller in the same way as it is performed in the case of Local Controller. In another embodiment, the Spectrum Controller and the Remote Controller are implemented as a single process that bypasses the QCI table and directly programs the flow tables based on the data presented by the Spectrum View.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

Embodiments have been shown for the effective implementation of a method and apparatus for virtualizing unlicensed spectrum. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system comprised of a plurality of programmable base stations that can use the unlicensed frequency spectrum, and a plurality of user equipment, the system comprising:
    (a) a modeler subsystem: (i) monitoring unlicensed frequency spectrum and collecting measurements in real-time from the plurality of programmable base stations and user equipment, (ii) building a model for each channel of the unlicensed frequency spectrum and for each base station location and mapping channel and location information into a quality of service class indicator (QCI) based on such measurements;
    (b) a viewer subsystem comprising a database storing channels, locations, and their corresponding QCI;
    (c) a spectrum controller subsystem dynamically mapping each packet flow to one of more matching channels in the unlicensed frequency spectrum matching the packet flow's QCI; and
    (d) either a local controller at a same location with each programmable base station or a remote controller, wherein either the local controller or the remote controller is in communications with the spectrum controller subsystem, or the spectrum controller subsystem is integrated into the local or remote controller, the local or remote controller programming the programmable base stations with the mapping of each flow into a channel in the unlicensed frequency spectrum.

2. The system of claim 1, wherein the spectrum controller subsystem periodically polls the database for each channel and location.

3. The system of claim 1, wherein the spectrum controller subsystem subscribes to event notifications, where whenever the QCI of any location and channel is modified, it receives a notification from the database.

4. The system of claim 1, wherein QCI is defined by standards or by the operator and has one or more of the parameters associated with it: a minimum, a maximum, a mean, a median, a 90th percentile of bandwidth availability, or a 99th percentile of bandwidth availability.

5. The system of claim 1, wherein each QCI has an associated meta-data that can be modified manually.

6. The system of claim 1, wherein the unlicensed frequency spectrum is composed of one contagious block of frequency bands.

7. The system of claim 1, wherein the unlicensed frequency spectrum is composed of a union of multiple disjoint blocks of frequency bands.

8. The system of claim 1, wherein the unlicensed spectrum corresponds to any of the following: an 802.11 standard or a WiFi standard.

* * * * *